(12) United States Patent
Tucker

(10) Patent No.: US 9,962,638 B1
(45) Date of Patent: May 8, 2018

(54) REMOVABLE DEWATERING DEVICE

(71) Applicant: Michael Tucker, Crystal Spring, PA (US)

(72) Inventor: Michael Tucker, Crystal Spring, PA (US)

(*) Notice: Subject to any disclaimer, the term of this patent is extended or adjusted under 35 U.S.C. 154(b) by 97 days.

(21) Appl. No.: 15/226,917

(22) Filed: Aug. 3, 2016

Related U.S. Application Data

(60) Provisional application No. 62/320,569, filed on Apr. 10, 2016.

(51) Int. Cl.
| | | |
|---|---|---|
| *E03F 1/00* | (2006.01) |
| *B01D 29/15* | (2006.01) |
| *B01D 35/157* | (2006.01) |
| *B01D 35/02* | (2006.01) |
| *B01D 29/58* | (2006.01) |
| *C02F 1/00* | (2006.01) |
| *E03F 5/10* | (2006.01) |
| *C02F 103/00* | (2006.01) |

(52) U.S. Cl.
CPC ......... *B01D 35/1573* (2013.01); *B01D 29/15* (2013.01); *B01D 29/58* (2013.01); *B01D 35/02* (2013.01); *C02F 1/004* (2013.01); *E03F 1/00* (2013.01); *E03F 5/103* (2013.01); *B01D 2101/04* (2013.01); *B01D 2201/16* (2013.01); *C02F 2103/001* (2013.01)

(58) Field of Classification Search
CPC .. E03F 1/00; E03F 5/101; E03F 5/103; B01D 29/15; B01D 29/33; B01D 29/58; B01D 35/02; B01D 2101/04; B01D 2201/167

USPC .............. 210/163, 170.03, 170.09, 338
See application file for complete search history.

(56) References Cited

U.S. PATENT DOCUMENTS

| | | | | |
|---|---|---|---|---|
| 3,722,686 A * | 3/1973 | Arnett | ............ | B01D 29/15 |
| | | | | 210/170.09 |
| 5,480,254 A * | 1/1996 | Autry | ............ | E03F 5/0401 |
| | | | | 210/163 |
| 6,077,423 A * | 6/2000 | Roy | ............ | B01D 29/15 |
| | | | | 210/170.03 |
| 6,416,674 B1 * | 7/2002 | Singleton | ............ | E03F 5/105 |
| | | | | 210/170.03 |
| 6,649,048 B2 * | 11/2003 | de Ridder | ............ | E03F 1/00 |
| | | | | 210/170.03 |
| 6,926,464 B1 * | 8/2005 | Weidmann | ............ | E03F 1/002 |
| | | | | 210/170.03 |
| 7,473,373 B1 * | 1/2009 | Danler | ............ | E03F 1/00 |
| | | | | 210/170.03 |
| 8,153,005 B1 * | 4/2012 | Wanielista | ............ | B01J 20/043 |
| | | | | 210/170.03 |
| 8,545,696 B2 * | 10/2013 | Tyner | ............ | E03F 5/101 |
| | | | | 210/170.03 |
| 9,334,618 B1 * | 5/2016 | Dodd | ............ | E03F 1/00 |

(Continued)

*Primary Examiner* — Christopher Upton

(57) ABSTRACT

The removable dewatering device is adapted for use in a retention basin, and filters debris from water passing there through. The present invention has an inner filter and an outer filter. The current conventional process for cleaning a retention basin filter device of debris is time consuming and arduous. Usually, retention basins must be completely drained in order to clean the filtration devices. The present invention is removed then cleaned and maintained while the retention basin is full of water, and requires considerably less effort and expense for maintenance and cleaning.

14 Claims, 3 Drawing Sheets

(56) References Cited

U.S. PATENT DOCUMENTS

| 9,719,240 B1* | 8/2017 | Montague | E03F 5/0404 |
| 2006/0078387 A1* | 4/2006 | Allard | E03F 1/00 |
| | | | 405/45 |

* cited by examiner

REMOVABLE DEWATERING DEVICE

CROSS-REFERENCE TO RELATED APPLICATION

The present application is related to and claims priority from prior provisional application Ser. No. 62/320,569, received in the Patent Office Apr. 10, 2016 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention. It is not an admission that any of the information provided herein is prior art, or material, to the presently described or claimed inventions, or that any publication or document that is specifically or implicitly referenced is prior art.

1. Field of the Invention

The present invention relates generally to the field of water filtration devices and more specifically relates to a dewatering device for use with a retention pond filtration system that filters storm water from a retention pond by use of a series of perforated pipes and other perforated members.

2. Description of the Related Art

A retention basin is used to manage storm water that doesn't penetrate into the ground. This storm water flows downhill, eventually leading it to the retention basin. A retention basin is used to improve water quality in local streams, rivers, and lakes as well as to retain water which may otherwise have flooded local areas. Retention basins are found on construction sites and often receive debris that is pushed in from storm water. The water within retention basins is often saturated in debris that environmentalists do not want to release into the local streams, rivers, and lakes. As such, a need exists to filter retention basin outflow water from debris. Filters are used within the retention basins to filter out debris from the water before it is released into local streams, rivers and lakes. These filters are often referred to as dewatering devices.

Dewatering operations are practices using various filtering systems to manage the discharge of pollutants when storm water must be removed from a construction site. Water cannot be pumped directly into a storm sewer system, streams or lake without first going through a sediment and pollutant control process. It is common practice for storm water to be allowed to settle into a retention basin for a time after a storm event and then be filtered before discharged into a storm sewer system, stream or lake. These filtration systems need to be periodically cleaned and maintained which normally requires completely emptying the retention basin. This can take up to 2 to 3 days depending on the size of the retention basin and typically includes an excavator and 3 men. Each cleaning and servicing of the filtering system can cost thousands of dollars.

Various attempts have been made to solve problems found in the dewatering filtration system art. Among these are found in: U.S. Pat. No. 6,926,464 to Lawrence W. Weidmann; U.S. Pat. No. 7,473,373 to Perry W. Danler; and U.S. Pat. No. 8,153,005 to Martin P. Wanielista. This prior art is representative of retention pond treatment dewatering filtration systems.

None of the above inventions and patents, taken either singly or in combination, is seen to describe the invention as claimed. A need exists for a dewatering filtration device that is reliable and can be removed for cleaning and servicing without the need to empty the retention basin, spend an inordinate amount of time, use an excavator or spend thousands of dollars.

BRIEF SUMMARY OF THE INVENTION

In view of the foregoing disadvantages inherent in the known art, the present invention provides a novel Removable Dewatering Device. The general purpose of the present invention, which will be described subsequently in greater detail, is to provide a retention basin water filtration system that is more easily and economically maintained and cleaned in comparison to conventional retention basin filtering and cleaning methods. The present invention, Removable Dewatering Device, can be detached and cleaned while the retention basin is full of water thereby saving considerable expense and time. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments of use for the present invention. The Removable Dewatering Device is constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a storm water pollutant filtering device and more particularly to a Removable Dewatering Device.

The current conventional process for cleaning a retention basin filter device of debris is time consuming and arduous. Usually, retention basins must be completely drained in order to clean the filtration devices. The present invention is removed then cleaned and maintained while the retention basin is full of water, and requires considerably less effort and expense for maintenance and cleaning.

A housing member is provided which comprises a perforated 48" diameter cylindrical corrugated metal pipe (hereinafter referred to as CMP). The perforated CMP housing member functions as an exterior filter debris removal component. A 12" perforated poly vinyl chloride (hereinafter referred to as PVC) pipe functions as an interior filter and provides the final debris removal component. Water is filtered by passing through a ½" hard ware cloth which is disposed about the exterior circumference of the CMP housing member, and thereafter by passing through a 100 sieve filter cloth located exterior to portions of the 12" perforated PVC pipe. Larger debris is filtered by the perforation passage holes in the CMP housing member and the 12" PVC pipe. Other well-known plumbing terms which are used in the description of the Removable Dewatering Device, and which will be referred to hereinafter in abbreviated form are SCH (which denotes schedule), and SDR (which denotes standard dimensions' ratio).

Figure 1:
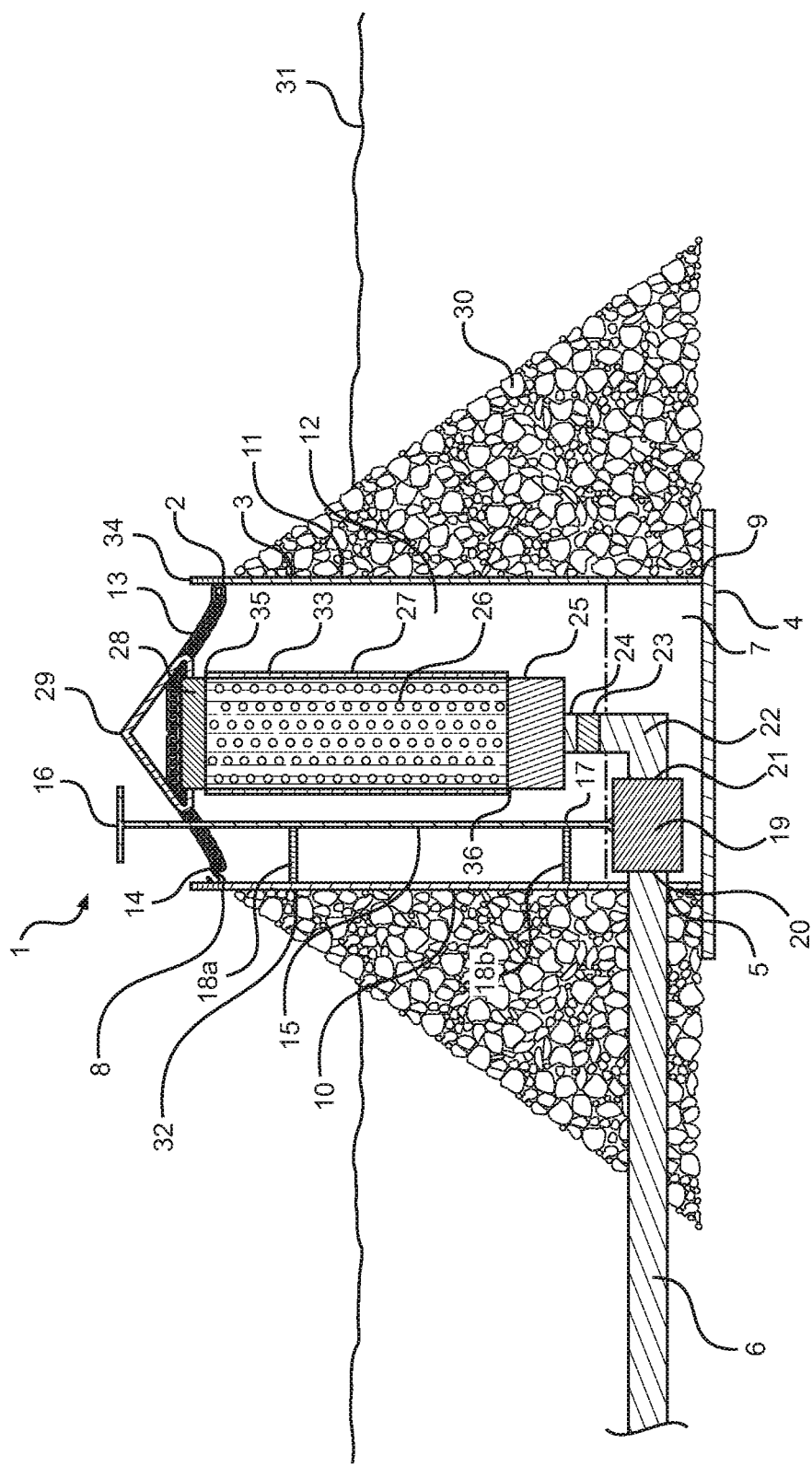
FIG. 1 shows a partial cross-sectional view of the Removable Dewatering Device in situ as used within a retention basin according to an embodiment of the present invention.
Figure 2:
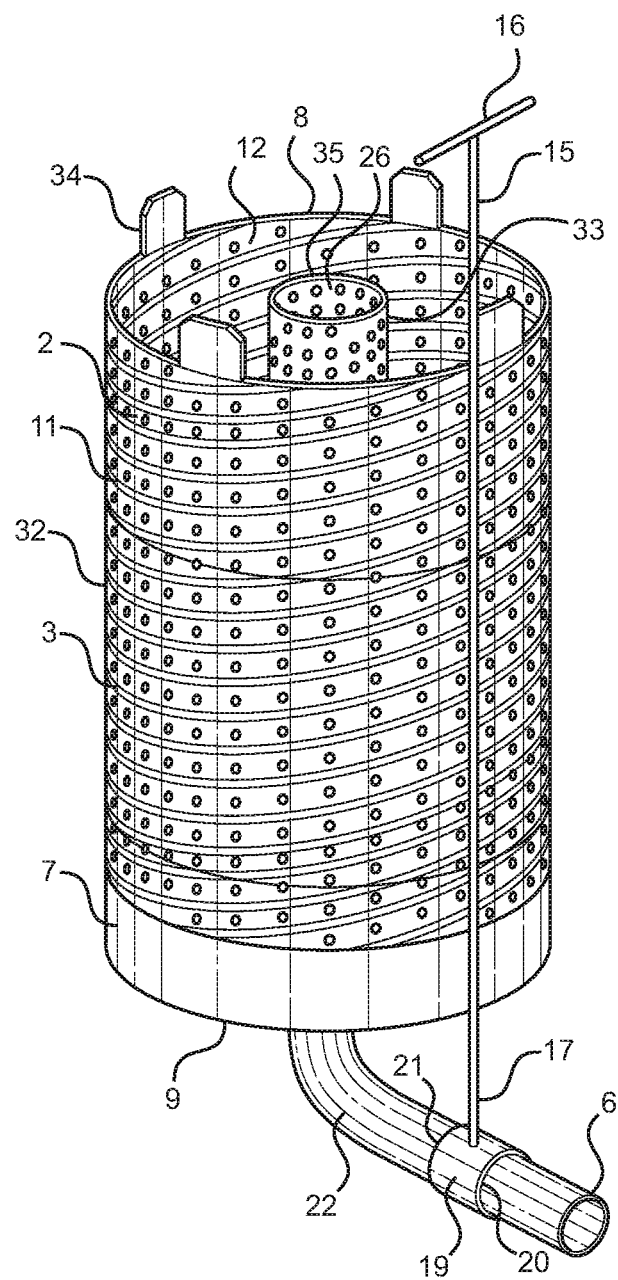
FIG. 2 is a partial view of the interior filter of the Removable Dewatering Device.
Figure 3:
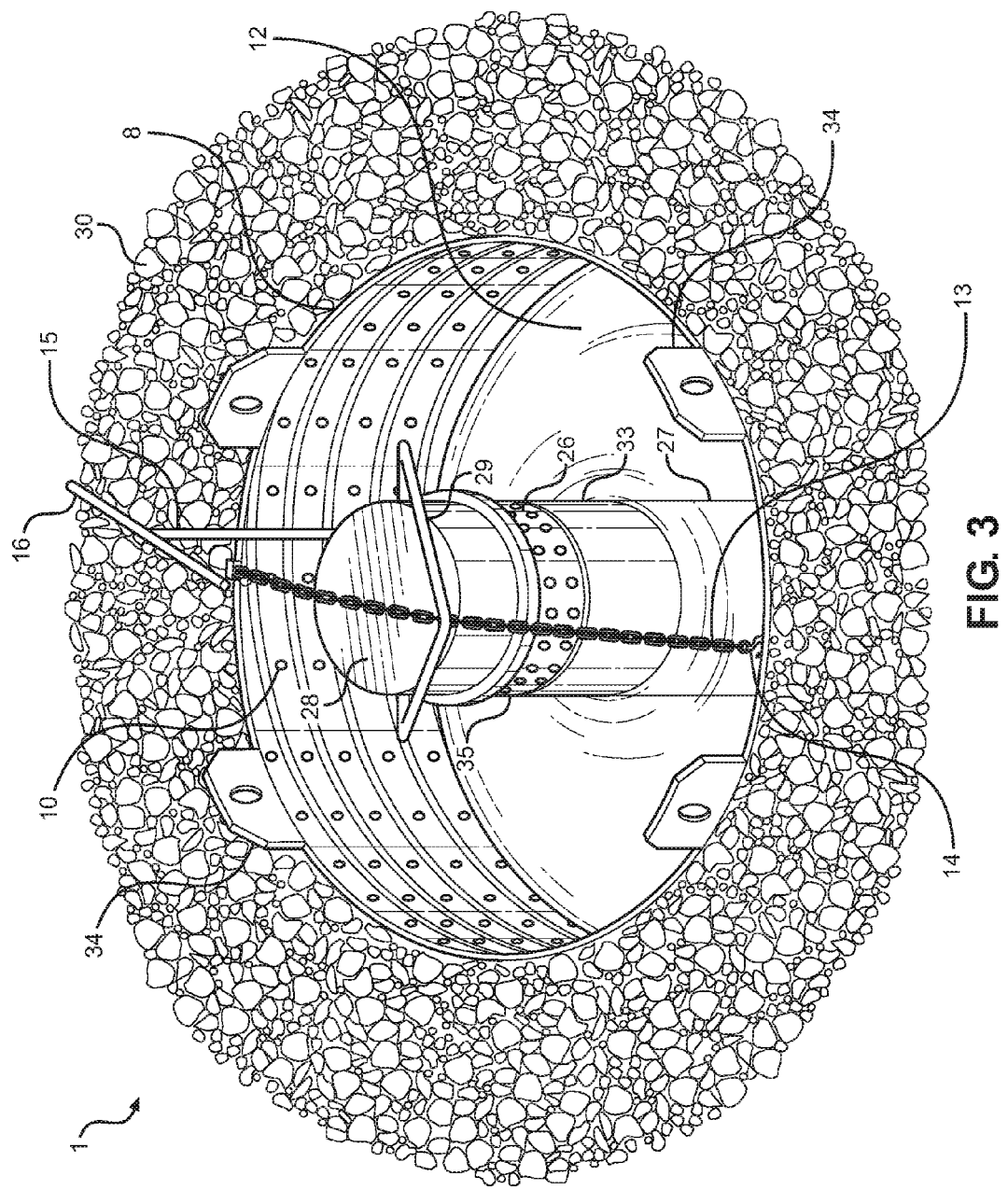
FIG. 3 is a top view of the Removable Dewatering Device in situ with the chain retainer in place.

With reference to FIGS. 1-3, the present invention Removable Dewatering Device is constructed within the water and relatively close to the edge of a retention basin 31. The CMP housing member 2 comprises a vertically oriented perforated 48" CMP for extending from the bottom of a retention basin 31 to above the high water level of the retention basin 31. The perforated CMP housing member 2, has a top end 8, bottom end 9, an inner surface 10, an outer surface 11 and an interior space 12. Upstanding aperture lugs 34 are disposed on the top end 8 for lifting the Removable Dewatering Device 1. Disposed directly exterior and encasing the outer circumference of the CMP housing member 2 is a pile of downwardly sloping rock or gravel cone 30. The stone penetrates into the water of the retention basin 31. The stone rises above the high water level of the retention basin 31 in such a manner as to allow a user access to the present invention. The stone or gravel cone 30 provides the first step in filtering debris which is then passed into the dewatering device 1.

Disposed about the exterior circumference on the outer surface 11 of the perforated CMP housing member 2 is ½" hardware cloth 3. The hardware cloth 3 is secured to the perforated CMP housing member 2 by any suitable means such as cable ties, clamps or the like. The ½" hardware cloth 3 assists in removing debris from water entering the perforated CMP housing member 2. Together the hardware cloth 3 and the perforated CMP housing member 2 comprise the exterior filter 32.

The perforated CMP housing member 2 is welded to a ¼" thick steel baseplate 4. The baseplate 4 extends across the bottom end 9 of the perforated CMP housing member 2 and at least six inches beyond on either side. The perforated CMP housing member 2 has an aperture 5 near the bottom end sufficient in size to receive a six inch SCH 40 PVC outfall pipe 6 which will be discussed in greater detail below.

A concrete anchor 7 is disposed on top of the steel baseplate 4 and within the interior space 12 of the perforated CMP housing member 2 at its bottom end 9. The purpose of the concrete anchor 7 is to stabilize the dewatering device 1 and prevent the removable dewatering device 1 from floating during conditions of flooding.

A six inch PVC ball valve 19 is embedded within the concrete anchor 7. The ball valve 19 has a first end 20 which is connected to the outfall pipe 6 and a second end 21 which is connected to a six inch SCH 40 90-degree bend pipe 22. The outfall pipe 6 is adapted to go out through the rock or gravel cone 30 and into a secondary water feature such as a stream or lake. Half of the 90-degree bend pipe 22 is embedded within the concrete anchor 7 with the distal end of the 90-degree bend pipe 22 extending out of the anchor 7.

A 6" 40 SCH SDR PVC gasketed coupling 23 is connected to the distal end of the 90-degree bend pipe 22. The gasketed coupling 23 allows for easier removal of a central twelve inch SDR 35 perforated pipe 26 for cleaning and servicing when necessary which will be discussed in greater detail below. A 6" SDR 35 PVC pipe 24 is connected to the distal end of the gasketed coupling 23. A 12" by 6" SDR 35 PVC reducer 25 is connected to the distal end of the six inch SDR 35 PVC pipe 24.

A 12"SDR 35 perforated PVC pipe 26 is provided and has a bottom end 36 and a top end 35. The bottom end 36 is connected to the distal end of the reducer 25 and is wrapped in 100 sieve filter cloth 27. The 100 sieve filter cloth 27 assists in removing small debris from the water. Together, the twelve-inch perforated pipe 26 wrapped in the sieve cloth 27 comprises the interior filter 33 and is the removable part of the removable dewatering device 1 of the present invention.

The interior filter 33 of the present invention is disposed at the center of the exterior filter 32 for easy access. The interior filter 33 rises slightly above the level of the exterior filter 32. A twelve inch SDR 35 PVC cap 28 is situated on the top end 35 of the twelve-inch perforated pipe 26. A V-shaped metal bail handle 29 is secured through the cap 28 to facilitate removal of the 12" perforated pipe for cleaning. A retaining chain 13 is disposed across the top end 8 of the perforated CMP cylindrical retaining member 2. The retaining chain 13 is fixedly attached on one side and releasably attached on the opposite side by a releasable binder 14. The chain 28 extends over the cap 28 and through the V-shaped bail handle 29 to secure the cap 28 and the twelve inch perforated PVC pipe 26.

A one-inch square tube metal valve handle 15 is vertically oriented within the interior space 12 of the perforated CMP housing member 2 near the inner surface 10. The valve handle has an upper T-shaped end 16. The valve handle 15 extends above the top end 8 of the perforated CMP housing member 2 for easy access and down into the concrete anchor 7 at its lower end to connect to the ball valve 19. By turning the upper T-shaped end 16 of valve handle 15, the ball valve 19 can be opened or closed. When it is time to remove the interior filter 33 for cleaning, the ball valve 19 is closed so that water from the outfall pipe 6 will not flow out of the basin without being filtered. A pair of braces 18a and 18b extend between and are connected to the valve handle 15 and the inner surface 10 of the perforated CMP housing member 2 so as to stabilize the valve handle 15 and prevent undesirable warpage, breakage or bending. One brace 18a is disposed near the top end 8 of the perforated CMP housing member 2 and one brace 18b is disposed near the bottom end 9 of the perforated CMP housing member 2. The valve handle 15 is thus stabilized such that it will not warp, break, or bend. The braces 18a, 18b of the present invention attaches to the valve handle 15 and to the cylindrical retaining member 2 in order to provide structural bracing support for the valve handle 15.

Water from the retention basin is filtered by flowing into the gravel cone 30 and then into the exterior filter 32 thereafter flowing through the interior filter 33 where it is further filtered before passing out through the six inch PVC outfall pipe 6 into streams or lakes. When a technician wishes to clean or service the Removable Dewatering Device 1, first the flow of water out of the Removable Dewatering Device is cut off by closing the ball valve 19.

Then the technician can unfasten the retaining chain 13 and entirely remove the interior filter 33 by pulling up, thereby releasing the interior filter 33 at the gasketed coupling 23 releasing the seal from the 6" SCH 40 90-degree bend pipe 24 for further servicing and cleaning of the interior filter 33. When the interior filter 33 is sufficiently cleaned and serviced, it is replaced by pushing it down onto the gasketed coupling 23 thereby resealing it to the 6" SCH 40 90-degree bend pipe 24.

Thus retention basin 31 water is more easily filtered and the Removable Dewatering Filter 1 is more easily and economically maintained and cleaned in comparison to conventional retention basin filtering and cleaning methods. The present invention, Removable Dewatering Device 1, can be detached and cleaned while the retention basin 31 is full of water thereby saving considerable expense and time. When the retention basin 31 has served its purpose, simply remove the interior filter 33 and open the ball valve 19 to drain the retention basin 31 without pumping.

It will be understood by those with ordinary skill in the art that the height of the exterior filter 32 and the height of the interior filter 33 are commensurate with the needs of the particular retention basin 31 site.

Upon reading this specification, it should be appreciated that, under appropriate circumstances, considering such issues as design preference, user preferences, marketing preferences, cost, structural requirements, available materials, technological advances, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A removable dewatering device for use within a water retention basin comprising:
    an exterior filter comprising:
        a cylindrical housing member having a top end, a bottom end, an inner surface, an outer surface, and an interior space; said cylindrical housing member having a plurality of perforations extending from said outer surface to said interior space, and an aperture, near said bottom end;
        a planar baseplate secured to said bottom end of said cylindrical housing member and extending beyond said outer surface;
        an anchor disposed on said planar baseplate and within said interior space for stabilizing said removable dewatering device;
        a ball valve embedded within said anchor, said ball valve having a first end, a second end, and being actuatable so as to be opened or closed;
        an outfall pipe extending through said aperture of said cylindrical housing member and connected to said first end of said ball valve;
        a ninety-degree bend pipe connected to said second end of said ball valve and having a distal end;
        a gasketed coupling connected to said distal end of said ninety-degree bend pipe;
    an interior filter comprising:
        a perforated pipe having a top end and a bottom end; said bottom end of said perforated pipe being releasably secured to said gasketed coupling such that said perforated pipe may be selectively removed for cleaning and accessing said exterior filter for maintenance;
    wherein, water from said retention basin is filtered by passing into said exterior filter thereafter flowing through said interior filter for further filtering before passing out through said outfall pipe when said ball valve is opened.

2. The removable dewatering device of claim 1, wherein said outer surface of said cylindrical housing member is wrapped with a hardware cloth for further removing debris from water entering therein.

3. The removable dewatering device of claim 2, wherein said perforated pipe is wrapped with a filter cloth for removing small debris from water entering therein.

4. The removable dewatering device of claim 1, wherein said top end of said cylindrical housing member comprises upstanding aperture lugs for lifting said removable dewatering device.

5. The removable dewatering device of claim 1, wherein said cylindrical housing member is encased by a pile of downwardly sloping rock or gravel.

6. The removable dewatering device of claim 5, wherein said outfall pipe extends through said pile of downwardly sloping rock or gravel into a secondary water feature.

7. The removable dewatering device of claim 1, wherein said anchor is a layer of concrete.

8. The removable dewatering device of claim 7, wherein said ninety-degree bend pipe is partially embedded within said layer of concrete.

9. The removable dewatering device of claim 1, further comprising a cap disposed on said top end of said perforated pipe.

10. The removable dewatering device of claim 9 wherein said cap includes a V-shaped bail handle for facilitating removal of said perforated pipe.

11. The removable dewatering device of claim 10, further comprising a retaining chain having an end fixedly attached to said top end of said cylindrical housing member and an opposed end extending over said cap, through said V-shaped bail handle, and releasably secured to an opposed side of said top end of said cylindrical housing member.

12. The removable dewatering device of claim 1, further comprising a valve handle having a lower end connected to said ball valve and an upper T-shaped end extending above said top end of said cylindrical housing member for opening or closing said ball valve.

13. The removable dewatering device of claim 12 further comprising a pair of braces extending between said valve handle and said inner surface of said cylindrical housing member for stabilizing said valve handle and preventing warpage, breakage or bending.

14. A removable dewatering device for use within a retention basin comprising:
    a forty-eight inch vertically orientated perforated CMP;
        said CMP having a top end and a bottom end an inner surface, an outer surface, and an interior space, said outer surface wrapped with a one half inch hardware cloth, said wrapped CMP serving as an outer filter, said CMP welded to a one fourth inch thick steel baseplate, said baseplate extending across said bottom end and at least six inches beyond on either side of said bottom end, an aperture near said bottom end sufficient in size to receive a six inch outfall pipe and, a concrete anchor disposed on top of said steel baseplate and within said interior perimeter of said CMP at said bottom end, a chain disposed across said top end of said CMP fixedly attached on one side and releasably attached at the opposite side by a releasable binder, a one-inch square metal tube valve handle vertically oriented within said interior space of said CMP approximate said interior wall of said CMP, said valve handle extending above said top end of said CMP at an upper end and down into said concrete anchor at a lower end, a pair of braces extending between and connecting said interior wall of said CMP and said valve handle, one brace of said pair disposed near said top end of said CMP and the other brace of said pair disposed near said bottom end of said CMP, said CMP adapted for encasement in a gravel cone within said retention basin, a six inch PVC ball valve connected to said lower end of said valve handle and embedded within said concrete anchor, wherein said valve handle actuates said ball valve between an open and closed position, said ball valve having a first end and a second end, said first end connected to a six inch PVC outfall pipe which extends out of said aperture in said CMP and is adapted to go out through said gravel cone into a secondary water feature, said second end connected to a six inch PVC SCH 40 90-degree bend pipe, half of said bend pipe also embedded within said anchor with a distal end extending out of said concrete anchor, a six inch 40 SCH SDR PVC gasketed coupling connected to said distal end of said 90 degree PVC bend pipe, a six inch SDR 35 SCH PVC pipe connected to the distal end of said 40 SCH PVC gasketed coupling, a twelve inch by six inch SDR 35 PVC reducer connected to the distal end of said six inch SDR 35 PVC pipe, a twelve inch SDR 35 perforated PVC pipe connected to the distal end of said reducer, said twelve inch perforated PVC pipe wrapped in 100 sieve filter cloth, said twelve inch perforated PVC pipe situated centrally in said interior space of said CMP and serving as an interior filter and extending slightly above said top end of said CMP, a twelve inch SDR 35 PVC cap situated on the distal end of said twelve inch perforated pipe, a V-shaped metal bail handle attached to said cap, said chain extending over said cap and through said V-shaped handle to secure said cap and said twelve-inch perforated pipe during conditions of flooding, wherein water from said retention basin is filtered by flowing first through said gravel cone and into said hardware wrapped perforated CMP and then flowing into said filter wrapped twelve inch perforated PVC pipe where it is further filtered before passing out through said six inch PVC outfall pipe into said secondary water feature and wherein said ball valve is closed by said valve handle so that said twelve inch perforated pipe can be removed, cleaned and serviced without having to drain said retention basin.

* * * * *